(12) United States Patent
Dehnicke et al.

(10) Patent No.: US 6,600,005 B1
(45) Date of Patent: Jul. 29, 2003

(54) METHOD FOR PRODUCING POLY-(1,4-PHENYLENAZINE-N,N-DIOXIDE) BY OXIDIZING P-BENZOQUINONEDOXIME

(75) Inventors: Stefan Dehnicke, Offenbach (DE);
Ernst List, Frankfurt am Main (DE);
Bernhard Krtsch, Raunheim (DE);
Adolf Zellner, Eggenfelden (DE);
Helmut Rullman, Woodlands, TX (US)

(73) Assignee: Rohm and Haas Denmark Finance A/S, Copenhagen (DK)

( * ) Notice: Subject to any disclaimer, the term of this patent is extended or adjusted under 35 U.S.C. 154(b) by 0 days.

(21) Appl. No.: 09/856,739

(22) PCT Filed: Dec. 10, 1999

(86) PCT No.: PCT/EP99/09784

§ 371 (c)(1),
(2), (4) Date: Nov. 2, 2001

(87) PCT Pub. No.: WO00/37539

PCT Pub. Date: Jun. 29, 2000

(30) Foreign Application Priority Data

Dec. 21, 1998 (DE) .......................... 198 59 097

(51) Int. Cl.$^7$ .............................. C08G 10/00
(52) U.S. Cl. ...................... 528/220; 528/397; 528/422; 528/425; 528/482
(58) Field of Search ................. 528/220, 397, 528/422, 425, 482

(56) References Cited

PUBLICATIONS

Hacker N.P.:"Investigation of the Polymerization of 1,4–Dinitrosobenzene by Low–Temperature Infrared and UV Absorption Spectroscopy" Macromolecules, vol. 26, 1993, pp. 5937–5942, XP002133720.

A. Ermakov, Y.F. Komkova "Conjugate Oxidation of p–Quinone Dioxime in a Mixture of Hydrogen Peroxide and Hydrochloric Acid" Zh. Org. Khim. 20, 10, 2252 (1984).

*Primary Examiner*—Duc Truong
(74) *Attorney, Agent, or Firm*—Stephen T. Falk

(57) ABSTRACT

The invention relates to a method for producing poly(1,4-phenylenazine-N,N-dioxide) and derivatives thereof which are substituted in the ring, by oxidizing p-benzoquinonedioxime or the corresponding derivative thereof which is substituted in the ring, using polyanions of the halogens bromine or iodine. Tribromide Br3- or triiodide I3- can be used as polyanions and these can be obtained in situ from H2O2 and a bromide or iodide.

14 Claims, No Drawings

METHOD FOR PRODUCING POLY-(1,4-PHENYLENAZINE-N,N-DIOXIDE) BY OXIDIZING P-BENZOQUINONEDIOXIME

DESCRIPTION

The invention relates to a process for preparing poly-(1,4-phenyleneazine-N,N-dioxide), which is also called poly-N,N-diazadioxide, and its nuclearly-substituted derivatives by oxidation of p-benzoquinonedioxime or its corresponding nuclearly-substituted derivatives, by means of polyanions of the halogens bromine or iodine.

Poly-(1,4-phenyleneazine-N,N-dioxide) is a highly effective cross-linker in rubber mixtures or rubber/metal binding agents. Moreover, the use of this substance as a reusable evaporation chemical for the manufacture of electronic circuits by way of laser inscriptions (Solventless Laser-Imageable Resist Process) is also known.

Principally available for the synthesis of poly-(1,4-phenyleneazine-N,N-dioxide) is only an oxidative path, starting from p-benzoquinonedioxime or its nuclearly-substituted derivatives, because the reduction of the corresponding nitro compounds cannot be kept at the level of the nitroso compound. Chlorine, nitrogen monoxide/sodium hypochlorite, sodium chlorate, nitric acid, iron III chloride and potassium hexacyanoferrate (III), for example, are known as oxidising agents.

The primary reaction product of all of the above-mentioned oxidation reactions is a dinitroso compound. A characteristic of almost all p-dinitroso compounds is their spontaneous polymerisation to form poly-N,N-azodioxides. For example, p-dinitrosobenzene is present as a monomer at −240° C. and as a dimer or oligomer between −90° C. and −50° C. At higher temperatures (−10° C. to 100° C.), only poly-(1,4-phenyleneazine-N,N-dioxide) is still found.

A disadvantage to some extent of the manufacturing processes known hitherto is, in most cases, the enormous salt load which accumulates. The following table gives examples of this:

TABLE 1

Salt load produced in the oxidation of p-benzoquinonedioxime as a function of the oxidising agent used.

| Oxidising agent | Salt load per 100 kg poly-N,N-azodioxide |
|---|---|
| $K_3[Fe(CN)_6]$ | 510 kg complex salt |
| $FeCl_3$ | 184 kg $FeCl_2$ |
| NO/NaOCl | 85 kg NaCl |
| $NaClO_3$/HCl | 85 kg NaCl |

Other processes are salt-load-free, but have other disadvantages instead. Thus, oxidation by means of nitric acid with yields of <80% is less economical and, because of the necessity of having to wash the reaction product effectively, a disadvantageous formation of waste water results.

Oxidation with elemental chlorine first of all takes place in a salt-load-free manner by forming hydrochloric acid, as does oxidation in the $H_2O_2$/hydrochloric acid system. In this case, elemental chlorine is released in situ from hydrochloric acid and hydrogen peroxide (equation 1). Chlorine is also used in this case as the actual oxidising agent.

2 HCl+$H_2O_2$→$Cl_2$+2 $H_2O$ (1)

$Cl_2$+$H_2O_2$→2$Cl^-$+2 $H^+$+$O_2$ (2)

The possible reaction of the chlorine which is formed with hydrogen peroxide in accordance with equation (2) can lead to the release of oxygen. Direct oxidation of p-benzoquinonedioximes with hydrogen peroxide is not observed, even in the case of a raised reaction temperature.

In this process, the mother liquor which results, including any wash water which may be required, has to be neutralised, which in turn leads to the creation of a salt load. It is also disadvantageous that continuing oxidation of the reaction product to form p-dinitroso compounds cannot be ruled out. These compounds are explosive and highly toxic.

In the context of mechanistic considerations, A. Ermakov and Y. F. Komkova (Zh. Org. Khim. 20, 10, 2252 (1984)) refer, corresponding to the oxidation with chlorine (from $H_2O_2$/hydrochloric acid), to the oxidation with iodine formed in situ (from $H_2O_2$ and potassium iodide) analogously to equation (1). A manufacturing process with iodine or iodine formed in situ is not described in this text, however.

The direct conversion of p-benzoquinonedioxime with elemental iodine (Comparative Example A) leads, however, to the primary dinitroso product only after relatively long reaction times in a reaction which is not very uniform, and the product can moreover be obtained only in very low yields. Elemental iodine thus appears to be an oxidising agent which is not very suitable for the industrial oxidation of p-benzoquinonedioximes.

Thus, until now, there has not been an industrial process which allows the quantitative oxidation of p-benzoquinonedioximes to form the corresponding poly-N,N-diazadioxides with strict avoidance of the formation of toxic dinitro by-products, and which additionally avoids a salt load, even an indirect one.

The object of the invention is therefore to overcome the disadvantages of the prior art and to develop a process for preparing poly-(1,4-phenyleneazine-N,N-dioxide) and its nuclearly-substituted derivatives, which process is distinguished by a complete conversion of the reaction partners whilst excluding the formation of dinitro derivatives, the avoidance of salt loads and a clear reduction in the amounts of waste water.

The object is achieved by the process presented in claim 1. Claims 2 to 12 develop the process further.

Surprisingly, it has been found that easily accessible derivatives of the halogens, namely the polyanions, lead to a clear increase in the chemical selectivity of the oxidation reactions described above. Polyanions ($X_z^-$, $z \geq 3$) of the halogens (X) are very easily accessible by means of the conversion of halide ions ($X^-$) with the elements, for example:

$X_2$+$X^-$→$X_3^-$ (3)

With increasing atomic number, trihalides of chlorine, bromine and iodine form increasingly easily, as is evident from the equilibrium constants in accordance with Table 2 that apply for the solvent water.

Table 2: Equilibrium constants of the trihalide formation in water ($X_2$+$X^-$→$X_3^-$)

$K_{chlorine}$=0.01

$K_{bromine}$=18

$K_{iodine}$=725

It can be seen that a very large excess of chloride ions is required in order to form trichloride ions ($Cl_3^-$). Experiments with rising concentrations of chloride ions in the HCl/$H_2O_2$ system actually lead to an increased chemical selectivity of the oxidation process.

If the oxidation is carried out at a given temperature in 15% hydrochloric acid, the poly-N,N-diazadioxide is obtained with yields of 90 to 95% and contains approximately 1% p-dinitrobenzene. An increase in the concentration of hydrochloric acid to 25 or 35% leads, with dinitrobenzene contents of only 6000 or 1200 ppm, respectively, in the end product, to a clear reduction in the formation of by-products. The increased chemical selectivity, however, is linked with a reduction in the isolated yields to approximately 80%. Therefore, the alteration of the redox potentials that accompanies the variation of the chloride ion concentration thereby leads to a loss of reactivity.

Because of the comparatively great equilibrium constants (Table 2) in the case of the halogens bromine and iodine, the bromide concentration or iodide concentration does not have to be chosen to be as high in order to obtain a comparatively great selectivity. Therefore, only the polyanions of the bromine and of the iodine are of practical significance for the process in accordance with the invention, in which case mainly tribromide or triiodide are used. The oxidising polyanions are to be used in at least a stoichiometric amount and at most in double the stoichiometric amount.

Advantageously, the corresponding alkali compound can be used as the tribromide or triiodide.

Instead of being added separately, the tribromide or triiodide can also be produced in situ from a bromide compound or iodide compound respectively and $H_2O_2$, in which case the corresponding alkali compound is advantageously used.

Particularly advantageously, the process can be carried out if triiodide ($I_3^-$) is selected as the oxidising agent, which is obtained in situ from an alkali iodide and $H_2O_2$. The alkali iodide can thereby be used in a catalytic to stoichiometric amount of 0.1 to 100% by mol, with respect to the amount of p-benzoquinonedioxime. In accordance with the equilibrium constants listed in Table 2, the iodide which is primarily formed reacts spontaneously to form alkali triiodide. A violet colouring by elemental iodide is therefore not observed. The reaction of the triiodide obtained in this way with p-benzoquinonedioxime leads selectively to the formation of poly-N,N-diazadioxides and iodide ions.

As a result of a controlled addition of further hydrogen peroxide, triiodide is formed anew from the iodide which is released. A catalysis cycle results, and LiI, NaI, KI, RbI or CsI can also be used in small amounts, i.e. not stoichiometric dosages, for the synthesis. A preferred charge amount of the alkali iodide is 1 to 5% by mol, with respect to the amount of p-benzoquinonedioxime used.

The $H_2O_2$ amount that is added typically amounts to 100 to 110% by mol, with respect to p-benzoquinonedioxime.

A preferred process variant is typically carried out as follows: p-benzoquinonedioxime (or one of its nuclearly-substituted derivatives) is suspended in water and mixed with 1 to 5% by mol of an alkali iodide. The well-stirred suspension is then mixed with 100 to 110% by mol $H_2O_2$ (with respect to p-benzoquinonedioxime used) in the form of a 30% hydrogen-peroxide solution at a temperature of between 10 and 65° C. for 2 to 4 hours. After the addition has ended, stirring is continued at the given temperature for another 1 to 2 hours in order to complete the reaction. The yellow to light-brown reaction product is filtered and washed with a little water. The mother liquor and filtrate are cleaned and can be used again without further treatment for the synthesis, so that ideally no waste water results.

Preferably, the process in accordance with the invention is carried out at a pH value of approximately 3 to 7. At this pH value, the process product poly-(1,4-phenyleneazine-N,N-dioxide), or one of its nuclearly-substituted derivatives, is formed in very good yields as an easily filterable, crystalline deposit. A lower pH value tends to lead to poorer yields, a higher pH value has the result that the product precipitates as a poorly filterable, amorphous mass. Corrections to the pH value can, for example, be carried out with small amounts of alkali hydroxide, such as NaOH or KOH, or, for example, with small amounts of mineral acids, such as HBr or HI.

The poly-(1,4-phenyleneazine-N,N-dioxide) prepared according to the process in accordance with the invention is free of p-dinitrobenzene. Even a 100% excess of $H_2O_2$ does not lead to a formation of dinitro derivatives. The process is thus highly chemically selective.

The isolated yields in the preferred triiodide oxidation process thus lie between 96 and 100%, which corresponds to a quantitative conversion.

The subject-matter of the invention is explained in greater detail with the aid of the following examples:

Comparative Example A: Oxidation of p-benzoquinonedioxime with elemental iodine ($I_2$)

27.6 g of p-benzoquinonedioxime (CD) (0.20 mol) and 25.4 g of iodine (0.10 mol) in 320 ml water were stirred in a round-bottom flask at room temperature. After 2 days, a sample was taken and dried. The solid which was obtained was almost completely soluble in chloroform. The formation of poly-(1,4-phenyleneazine-N,N-dioxide), which is not very soluble in chloroform, could therefore be ruled out to a great extent. After a reaction time of a further 6 days, the reaction mixture was concentrated by evaporation in order to dry it and then absorbed in chloroform. After filtration and drying, only 0.90 g of a brown-black solid could be isolated. In addition to other products, the IR spectrum indicates the presence of poly-(1,4-phenyleneazine-N,N-dioxide).

Examples 1 to 9: Oxidation of p-benzoquinonedioxime with triiodide $I_3^-$

In Examples 1 to 9, the following general procedure was followed:

41.4 g of p-benzoquinonedioxime (CD) (0.30 mol) in 250 ml water was placed in a 1 l four-necked flask with KPG stirrer, drip funnel, reflux condenser and internal thermometer and mixed with an appropriate amount of alkali iodide (see Table 3). Then, 35.5 g of Perhydrol ($H_2O_2$ 30%) (0.31 mol $H_2O_2$) was added to this mixture dropwise over 3 hours, in such a way that the internal temperature of the reaction vessel was constantly between 20 and 40° C. Depending on the purity of the starting substances, the pH value was between 2.6 and 5.5.

After this, stirring was continued for 1 hour, the mixture was then filtered and washed with 50 ml water. The yellow-brown solid which was obtained was then dried in the desiccator over $P_2O_5$ until constant weight and identified by means an of IR spectrum. The yields of the poly-(1,4-phenyleneazine-N,N-dioxide) obtained in each case are listed in Table 3.

TABLE 3

Alkali iodide and its charge amount, and also yields of the poly-(1,4-phenyleneazine-N,N-dioxide) obtained

| Example | alkali iodide | charge amount of alkali iodide [g]/[mol %] on CD | yield [g]/[%] |
|---|---|---|---|
| 1 | NaI | 2.25/5.00 | 40.7/99.7 |
| 2 | KI | 0.50/1.00 | 38.7/94.8 |

TABLE 3-continued

Alkali iodide and its charge amount, and also
yields of the poly-(1,4-phenyleneazine-N,N-dioxide)
obtained

| Example | alkali iodide | charge amount of alkali iodide [g]/[mol %] on CD | yield [g]/[%] |
|---|---|---|---|
| 3 | KI | 1.25/2.50 | 39.8/97.5 |
| 4 | KI | 2.50/5.00 | 39.7/97.2 |
| 5 | CsI | 1.95/2.50 | 39.8/97.5 |
| 6 | CsI | 3.90/5.00 | 39.9/97.8 |
| 7 | KI + CsI* | 1.25 1.95/2.50 2.50 | 39.8/97.5 |
| 8 | CsI** | 3.90/5.00 | 39.8/97.5 |
| 9 | CsI*** | 3.90/5.00 | 40.6/99.5 |

*The reaction was carried out at 40–50° C. and heated to 65° C. for the after-reaction.
**Mother liquor from example 6.
***$H_2O_2$ was added with 100% excess; after-reaction 2 hours.

In all cases, the IR spectrum displayed chemical identity with a reference spectrum. P-dinitrobenzene could not be detected in any case (GC, chloroform extract against external standard). The products were all very easily filterable. Under the raster electron microscope, they displayed pellet-shaped and rod-shaped crystals with an edge length of 0.5 to 5 $\mu$m (sporadically up to 40 $\mu$m), which generally settled together to form spherical agglomerates of 10 to 20 $\mu$m.

What is claimed is:

1. A process for preparing poly-(1,4-phenylenazine-N,N-dioxide) and its nuclearly-substituted derivatives comprising oxidizing p-benzoquinonedioxime or its corresponding nuclearly-substituted derivatives with polyanions of the halogens bromine or iodine.

2. The process according to claim 1, wherein said polyanion is selected from the group consisting of tribromide and triiodide.

3. The process according to claim 2, wherein said tribromide is at least one alkali tribromide selected from the group consisting of $LiBr_3$, $NaBr_3$, $KBr_3$, $RbBr_3$ and $CsBr_3$.

4. The process according to claim 2, wherein said tribromide is obtained in situ from the corresponding bromide $Br^-$ and hydrogen peroxide $H_2O_2$.

5. The process according to claim 2, wherein said triiodide is an alkali triiodide selected from the group consisting of $LiI_3$, $NaI_3$, $KI_3$, $RbI_3$ and $CsI_3$.

6. The process according to claim 2, wherein said triiodide is obtained in situ from the corresponding iodide $I^-$ and hydrogen peroxide $H_2O_2$.

7. The process according to claim 5, wherein said alkali iodide is present in an amount of from 0.1 to 100% by mol relative to the p-benzoquinonedioxime or to one of its nuclearly-substituted derivatives.

8. The process according to claim 6, wherein said alkali iodide is present in an amount of from 0.1 to 100% by mol relative to the p-benzoquinonedioxime or to one of its nuclearly-substituted derivatives.

9. Process according to claim 7, wherein the alkali iodide is present in an amount of from 1 to 5% by mol relative to the p-benzoquinonedioxime or to one of its nuclearly-substituted derivatives.

10. Process according to claim 8, wherein the alkali iodide is present in an amount of from 1 to 5% by mol relative to the p-benzoquinonedioxime or to one of its nuclearly-substituted derivatives.

11. The process according to claim 6, wherein the $H_2O_2$ is used in an amount of 100 to 110% by mol relative to the p-benzoquinonedioxime or to one of its nuclearly-substituted derivatives.

12. The process according to claim 1, wherein said p-benzoquinonedioxime or one of its nuclearly-substituted derivatives is suspended in water before the oxidation.

13. Process according to claim 1, wherein the reaction temperature is 10 to 65° C.

14. Process according to claim 1, wherein the reaction is carried out at a pH of from 3 to 7.

* * * * *